Dec. 26, 1967 E. M. REIBACK ETAL 3,360,646
UNIFORM GAMMA IRRADIATION OF BULK GRAIN MATERIAL
Filed Jan. 29, 1965 2 Sheets-Sheet 1

INVENTORS.
EARL M. REIBACK
OTTO A. KUHL
BY
ATTORNEY

Dec. 26, 1967   E. M. REIBACK ET AL   3,360,646
UNIFORM GAMMA IRRADIATION OF BULK GRAIN MATERIAL
Filed Jan. 29, 1965   2 Sheets-Sheet 2

INVENTORS.
EARL M. REIBACK
OTTO A. KUHL

BY
ATTORNEY

United States Patent Office 3,360,646
Patented Dec. 26, 1967

3,360,646
UNIFORM GAMMA IRRADIATION OF BULK
GRAIN MATERIAL
Earl M. Reiback, New York, and Otto A. Kuhl, Northport, N.Y., assignors, by direct and mesne assignments, to the United States of America as represented by the United States Atomic Energy Commission
Filed Jan. 29, 1965, Ser. No. 429,185
6 Claims. (Cl. 250—44)

ABSTRACT OF THE DISCLOSURE

Apparatus for the bulk irradiation of grain. The grain is gravity fed through a grid of spaced, extended gamma ray sources which are constructed and spaced for uniform and not excessive dosages of gamma rays.

---

The invention described herein was made in the course of, or under a contract with the U.S. Atomic Energy Commission.

The present invention relates to a bulk grain irradiator and more particularly to irradiation apparatus utilizing gamma-rays for the control of destructive infestation in bulk grain.

It has been estimated that insects destroy at least 5% of the world production of cereal grains after harvest and in storage. According to a recent study by the United Nations this is estimated to be at least 15,000,000 tons of grain each year. Thus it is readily seen than an economic and practical system of insect control in bulk grain would enhance materially the immediate capability of the Earth to feed its human population.

Efforts have long been directed to the reduction of damage caused by the infestation of grain by insects, and those dealing with the insect problem in wheat grain in particular are typical. Of most concern to the miller are insects which feed within the grain kernels, as insects which are external feeders pose a lesser problem because the cleaning processes now in general use are very effective in minimizing their impact.

To illustrate the problems posed by the internal feeders, some insects devour at least their own weight of food each week. Their larvae, during three to four weeks of development, eat many times their own weight. As a result, in the Great Plains regions of this country, losses in stored wheat may run as high as 10% in one season.

Complicating the problem are the outstanding resistivity powers of certain types of insects which attack wheat. The cadelle, a boring class of insect, burrows into woodwork to form a sheltered place to transform into the pupal or adult forms. This insect is equipped with jaws powerful enough to cut through metal foils. The Khapra beetle, a relatively new insect pest in this country, is difficult to detect because of its size which is less than 1/8 inch. This beetle cannot be eradicated by conventional insecticides, sprays or customary dosages of fumigants for treatment of grains. Furthermore, most wheat insect pests have short generations, a high rate of reproduction, and long-lived individuals, with the result that under certain conditions, outbreaks are likely to occur suddenly, even after a terminal elevator for storage has just been fumigated and is apparently clean.

It has been mentioned that at the present time insecticides and fumigants are used to control insect infestation. These methods are of very limited value, for reasons including some of those already mentioned, such as the resistance which some insects have to the insecticides and the fast growth of the insects from small numbers remaining after fumigation. Furthermore, the problem is rendered somewhat more complex as the result of the manner by which it is necessary to operate flour mills. Some mills find it necessary to draw wheat from many sources to meet their requirements with the result that there have been cases where as many as 30 different species of grain-infesting insects have been found in grain arriving at the mills. This makes it impossible to establish a concentrated program to eliminate a specific type of insect as no one technique is suitable for the elimination of all possible insects. A further limit on the use of insecticides, especially methyl bromide which is in common use, is the fact that some persons are allergic to these materials, even in very small amounts.

It should also be mentioned at this time that the use of insecticide can and usually does involve a very great additional expense. For example, a typical program of insect prevention and control now followed by a flour mill would involve a general fumigation, using the aforementioned methyl bromide, hydrocyanic acid, or chloropicrin once a year. This is supplemented with local fumigation of milling units every two weeks and removal of milling stock twice a week using a heavy duty vacuum cleaner. In addition, insecticidal sprays are used for mill sanitation, but very careful controls under local government control are necessary to avoid excessive insecticidal residues from appearing in milled products which would be a health hazard.

Thus it is seen that modern efforts directed toward the control and elimination of insect infestation of grains is a difficult and expensive continuing operation and the results are far from satisfactory as indicated by the continued heavy losses in grain arising from this source.

It has already been suggested that some form of radiation could be used to eliminate insects from bulk grain material, as it is known, for example, that insects can be destroyed by certain types of radiant energy. Tests indicate that relatively small doses of gamma radiation will kill insects, their pupa and eggs. However, this type of radiant energy is highly penetrating and very dangerous when improperly used or when used without adequate controls. Furthermore, the dosages necessary to accomplish these purposes would have to be controlled within very narrow limits as the highly penetrating nature of this energy which makes it is useful is capable of affecting adversely the baking qualities and other desirable characteristics of flour. Even slight changes in the baking qualities would render the flour useless for baking.

Techniques have been proposed for using gamma radiation for the purposes described above. A batch arrangement has been considered but has been found to be incapable of exercising close control over dosages and of obtaining a uniformity of dosage throughout the produce without resorting to economically prohibitive apparatus and controls. Another system proposed is the so-called annular ring concept in which the product is irradiated as it passes through a series of concentric annular rings, the source of radiation being located in a center tube. This arrangement is very complex mechanically with the result that the cost of the system makes it prohibitive as a practical system.

By this invention it is now possible to utilize gamma radiation in an effective, efficient, safe and practical manner for the control and elimination of insect infestation of bulk grain.

One of the principal advantages of this invention is that it accomplishes to an extent what other irradiation arrangements are unable to accomplish, namely, the equal irradiation of all portions of the product material while in close proximity to the source material. Non-uniformity of dosage is caused by the fact that as the grain approaches the source there is a steep gradient in intensity.

Thus small changes in distance between the grain and source in this region result in major changes in dosages. The problem is resolved in this invention by causing the grain to pass through a grid of sources which are provided with spacer sheaths to prevent the grain from coming close enough where this steep gradient exists, but at the same time, close enough so as to obtain adequate dosages for the purpose desired. In a preferred embodiment of this invention, the grid consists of parallel lines of sources in a plane, each line source being enclosed in a spacer sheath with passageways between the lines so that the grain may flow through the grid structure. When the spacing between the individual lines comprising the source grid is small, each portion of the product "sees" a similar source geometry in its immediate vicinity as it passes through the grid, while at the same time not approaching close enough to the sources where the intensities of radiation increase rapidly. As will be seen from a description below of a preferred embodiment of this invention, the grid system provides a high uniformity of dosage, accurate control over dosage, an effective scale-up potential, a high efficiency, and a simple mechanical auxiliary system for moving the grain.

It is thus a first object of this invention to provide an arrangement for the irradiation of bulk granular material by gamma rays.

It is another object of this invention to provide for the controlled application of intense radioactivity.

Another object of the invention is the efficient utilization of gamma radiation for the control and destruction of insect infestation in grain.

Still another object of the invention is the safe and effective utilization of radioactive source material in the irradiation of bulk granular material.

Other objects and advantages of this invention will hereinafter become obvious from the following description of a preferred embodiment of this invention taken with the accompanying drawings in which.

Figure 1:
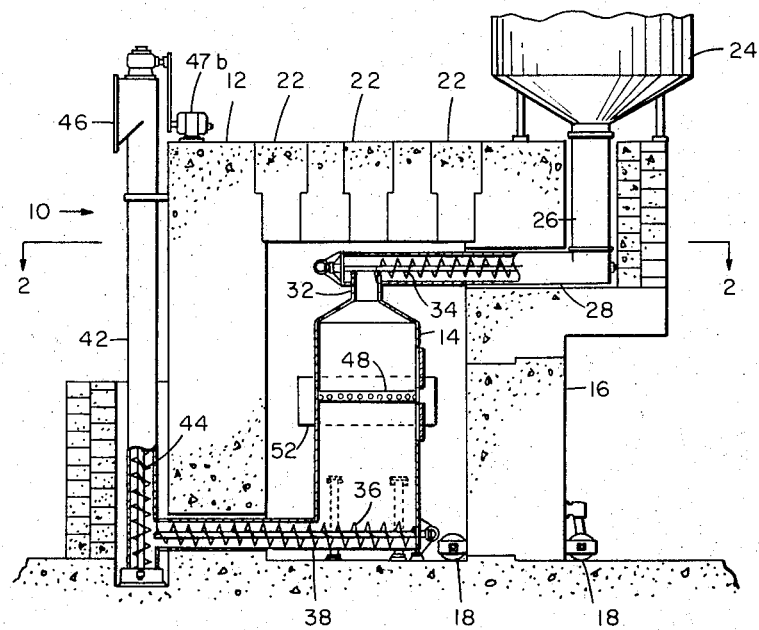
FIG. 1 is a sectional elevation view of an irradiation plant embodying the principles of this invention.
Figure 2:
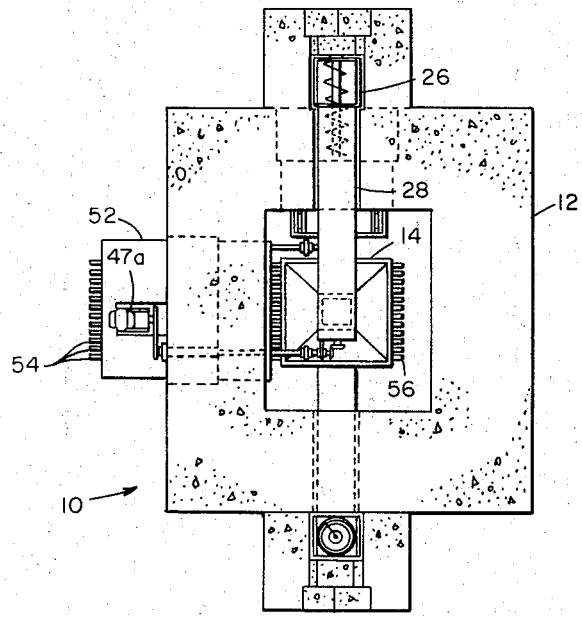
FIG. 2 is a side plan view taken in partial section along 2—2 of FIG. 1.

Referring to FIGS. 1 and 2, there is illustrated an irradiation facility 10 in accordance with this invention consisting of a concrete cell 12 in which is located irradiator bin 14. As seen in FIG. 2, bin 14 is square or rectangular in cross-section. Cell 12 would be provided with a concrete plug door 16 mounted on wheels 18 for movement, and with plugs 22 for access to bin 14 from the top. Mounted above cell 12 is a hold-up bin 24 for containing the grain to be irradiated. Vertical and horizontal ducts 26 and 28 lead the grain to the top opening chute 32 of irradiator bin 14. Upper horizontal duct 28 is provided with a screw conveyor 34 to carry the grain from vertical duct 26 to chute 32.

At the bottom of irradiator bin 14 a screw conveyor 36 carries the grain after irradiation through a lower horizontal duct 38 to a vertical duct 42 having a screw conveyor 44 for carrying the grain upwardly to an exit chute 46 where the grain would be dumped into means for transporting the grain to a sterile storage facility. Screw conveyors 34, 36 and 44 are driven as is understood in the art by suitable motors such as 47a and 47b and associated power train apparatus.

Figure 3:
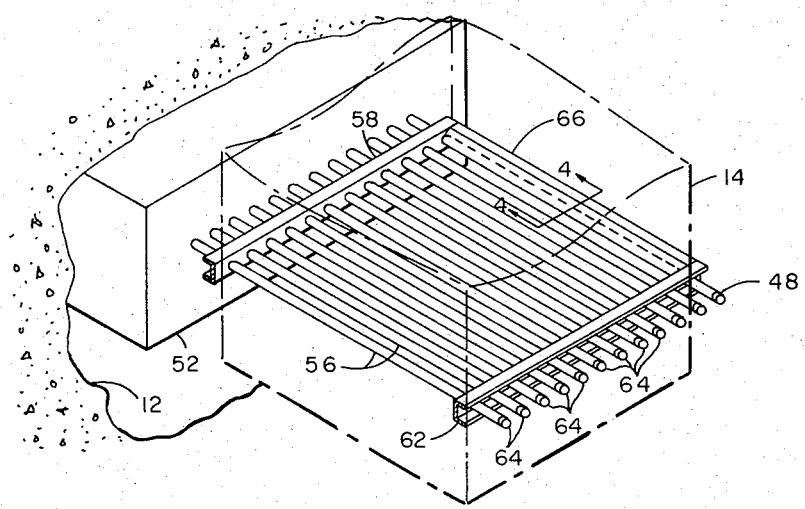
FIG. 3 is an isometric view of the grid assembly.

As will be seen from FIG. 1, the central portion of irradiator bin 14 is provided with a grid assembly 48, which will be described below. Mounted within one wall of cell 10 and extending outwardly is a concrete storage cask 52 through which pass a plurality of hollow extension rods 54. Referring to FIG. 3, as well as FIG. 2, it will be seen that grid assembly 48 consists of a plurality of spaced grid tubes or sheaths 56 arranged in a horizontal plane supported near the opposite ends thereof by a pair of channels 58 and 62. One end of each tube 56 farthest away from storage cask 52 is covered with an end cap 64. The other end of each tube 56 is open and aligned with an extension rod 54 which extends to and through storage cask 52.

Figure 4:
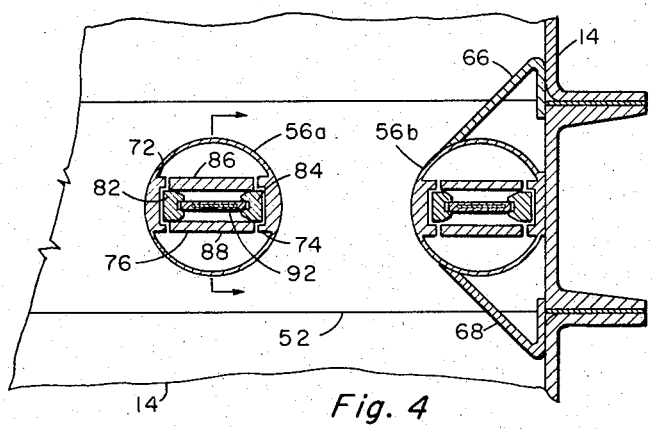
FIG. 4 is a view along 4—4 of FIG. 3.

For details of grid tubes 56, reference is made to FIG. 4 showing a pair of tubes designated 56a and 56b, the latter tube being the end tube mounted along one wall of irradiator bin 14. Tube 56b may be welded or otherwise attached to the wall as illustrated. A pair of flow shields 66 and 68 are mounted as shown to prevent the entrapment of any grain within crevices formed by tube 56b. It is understood that tube 56 located along the opposite wall of bin 14 is similarly provided with flow shields.

Figure 5:
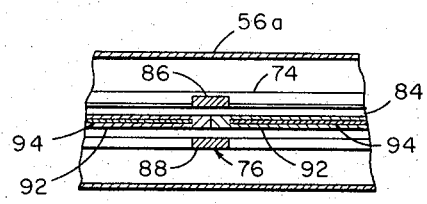
FIG. 5 is a view along 5—5 of FIG. 4.

Each of tubes 56 is provided with similar appropriate gamma ray source material such as cobalt-60. A typical source arrangement is shown in tube 56a illustrated in FIG. 4 and the section thereof illustrated in FIG. 5. Tube 56a is provided with a pair of grooved guide elements 72 and 74 in which slides a strip assembly 76. Assembly 76 consists of a pair of rods 82 and 84 riding in guide elements 72 and 74, respectively, and a plurality of upper and lower spacer segments 86 and 88 attached to rods 82 and 84 to maintain the desired spatial relationship as illustrated. Supported within assembly 76 is a series of elongated flat strips 92 each of which sandwiches within a strip 94 of cobalt-60 forming a line source. As is readily seen from FIG. 4, assembly 76 is slideable within tube 56a the end of each assembly 76 terminating within storage case 52 is attached to a rod or other means (not shown) for withdrawing the former into an extension rod 54 so that assemblies 76 may be retracted into storage cask 52 when bin 14 is not in use. When it is desired to irradiate the grain product, assemblies 76 are pushed into bin 14. The use of flat strips 94 of cobalt-60 horizontally disposed in a sleeve as illustrated in FIG. 4 is an important feature of this invention. Consider that bin 14 is completely filled with grain so that tubes 56a and 56b are hence completely surrounded by grain. Due to the thinness of strips 94, the bulk of the gamma rays are those directed vertically up and down from strips 94 and are completely absorbed by the grain. Thus, adjacent sources receive minimal radiation from each other. Further, the use of thin strips of the source material, e.g., cobalt-60, reduces the amount of self absorption and reduces heating of the material itself.

In the operation of the grain irradiator just described, hold-up bin 24 is filled with grain and screw conveyor 34 is operated until irradiator bin 14 is completely filled with grain. After bin 14 is initially filled, assemblies 76 are then positioned within bin 14 and the various screw conveyors already described are set in operation. During normal use of the system, bin 14 is always maintained almost completely full with grain and screw conveyor 34 is operated at a rate to maintain this condition. A controlled constant flow of the grain through bin 14 is maintained by operation of the lower screw conveyor 36. The dosage applied to the product is adjusted by regulating the drive rate of the lower (output) screw conveyor 36. It should be pointed out that while lower screw conveyor 36 would be operated at a calibrated rate to obtain the desired dosage, upper screw conveyor 34 could then be controlled automatically by any suitable level sensing device located in the upper portion of bin 14. The level of the grain is always maintained well above grid 48.

The grain discharged by output conveyor 36 is picked up by conveyor 44 and discharged through chute 46 into suitable storage or shipping apparatus.

A unique feature of this invention is the use of a source through which the grain to be irradiated passes while at the same time preventing the grain from coming close enough to the source material where intensity gradients are high and prohibitive non-uniformity in dosages occurs.

It has been discovered that a sheath surrounding and spaced from each source can be utilized to keep the grain from coming close enough to the source where the intensity of radiation rises steeply as it approaches the source. Thus each source is enclosed in a spacer sheath with passageways between the lines so that the grain flows literally through the source grid. If the spacing between the individual lines comprising the grid source is small, each portion of the product would "see" a similar source geometry in its immediate vicinity as it passes through the grid, but the rate of flow drops off sufficiently to render the arrangement inefficient. On the other hand, as the source line spacing increases, the dose rate non-uniformity between lines also increases. This non-uniformity, which is defined as the ratio of the dose rate delivered at the surface of a source sheath to the dose rate delivered at a point midway between two adjacent source sheaths, may be seen from the fact that the geometric attenuation from a line source follows the relation $1/R$, where R is the distance of the dose point from the line. The curve, if plotted, is seen to be most steep as the dose point approaches closely to the line sources. Hence, the spacer sheath as described above is found to be useful to minimize the dose non-uniformity. The sheath serves the additional function of allowing the source to be withdrawn freely into storage.

An effective relationship between the source sheath diameter and the line source spacing has been found for the purposes of this invention to be one in which the center-to-center source spacing is twice the source sheath diameter. This relationship has been found to be fairly independent of the magnitude of each of the parameters provided the 2:1 ratio is maintained. As an example, for illustrative purposes only, the dimensions chosen for a particular embodiment are a center-to-center line source spacing of 4 inches and a sheath or tube diameter of 2 inches. This causes a flow restriction at the center plane of the source grid, the restricted area at its minimum point being 50% of the area of the entire chamber through which the product is flowing. This relationship between source spacing and sheath diameter, for cobalt-60 as a source and grain as a product, has been found to produce a dose rate non-uniformity of 1.075. The relative dose received by the grain which flows in a plane including a source rod is 1.0, compared to the dose of 0.93 received by grain which flows in a plane midway between two source rods.

To eliminate non-uniformity of doses due to end effects, the end sources (i.e., tube 56b) are augmented to about 1.5 times that of the other sources. The end effect occurring at the tips of the various source tubes is avoided by extending tubes 56 beyond the walls of irradiator bin 14 as shown in FIG. 3.

It will be recalled also that each line source consists of a flat strip which is located horizontally in its own tube 56. Studies of the integrated dose received by each grain as it moves down the plenum chamber through the grid, taking into account that where the rods restrict the flow area the grain is caused to move at a faster rate, indicate that both a high efficiency of over 50% and a high level of uniformity may be achieved, this uniformity being less than one third greater or less than the average dose. Based upon what has been done before, this efficiency is quite high for the degree of uniformity achieved, and together with the high degree of uniformity attainable in the dosages applied to bulk grain products, represents a substantial improvement in the art.

To increase the capacity of the apparatus described it is only necessary to increase the flow rate and the source strength in direct proportion to each other. In this simple way the irradiator can be made adaptable for a variety of conditions. Of course, in addition, it is simple to scale-up the system by merely increasing the plenum width and height.

It is thus seen that there has been provided a unique and improved radiation facility for the irradiation of bulk material. While only a preferred embodiment of this invention has been described, it is understood that many changes thereof may be made without departing from the spirit of this invention the scope of which is to be limited only by the appended claims.

We claim:
1. Apparatus for the irradiation of bulk material comprising:
   (a) means forming a chamber substantially filled with said material during irradiation;
   (b) means consisting of a grid of spaced parallel tubular sheaths containing line sources of gamma rays extending through said chamber in a plane at an angle substantially perpendicular to the direction of flow of said material through said chamber, each of said sources being spaced from its sheath to prevent said material from coming close enough to said source to receive an excessive dosage of radiation; and
   (c) means for regulating the flow of material downwardly through said chamber to obtain the desired dosages and maintain said chamber substantially filled with said material during operation of said apparatus.

2. The apparatus of claim 1 in which said sources are retractable to permit storage of said sources out of said chamber.

3. The apparatus of claim 1 in which each line source consists of an assembly of flat elongated strips containing flat strips of gamma source material, said strips being disposed in a horizontal plane, and said sheaths containing means to permit the withdrawal and remote storage of said sources when not in use.

4. The apparatus of claim 3 in which each of said sheaths contains a pair of guide members and said assembly consists of a pair of spaced rods mounted for movement in said guide members, said flat strips of source material being supported along the edges thereof by said spaced rods.

5. Apparatus for the application of nuclear radiation to bulk granular substances comprising:
   (a) a source array of nuclear radiation arranged in a plurality of substantially parallel lines disposed in a plane and spaced apart from each other;
   (b) means for passing the substance to be irradiated through and at an angle to said plane between the individual radioactive source lines at a controlled rate of speed; and
   (c) means for preventing the substances to be irradiated from coming closer than a predetermined distance from each source line, said means consisting of a hollow member enclosing and spaced from said source line.

6. The apparatus of claim 5 in which the material to be irradiated flows past the source lines by gravity flow.

References Cited

UNITED STATES PATENTS

| | | | |
|---|---|---|---|
| 2,884,538 | 4/1959 | Swift | 250—84 X |
| 3,153,725 | 10/1964 | Attix | 250—44 X |
| 3,264,473 | 8/1966 | Levin et al. | 250—44 |
| 3,280,328 | 10/1966 | Gieskieng | 250—83.3 |

RALPH G. NILSON, *Primary Examiner.*

S. ELBAUM, *Assistant Examiner.*